United States

Kawakami et al.

[11] 3,877,017
[45] Apr. 8, 1975

[54] METHOD OF DRIVING LIQUID CRYSTAL DISPLAY DEVICE FOR NUMERIC DISPLAY

[75] Inventors: Hideaki Kawakami; Yutaka Yoneda, both of Hitachi, Japan

[73] Assignee: Hitachi, Ltd., Tokyo, Japan

[22] Filed: Feb. 11, 1974

[21] Appl. No.: 441,356

[30] Foreign Application Priority Data
  Feb. 9, 1973  Japan.............................. 48-15493

[52] U.S. Cl. ...... 340/336; 340/166 EL; 350/160 LC
[51] Int. Cl. ............................................. G08b 65/36
[58] Field of Search ........................ 340/336, 324 R; 350/160 LC

[56] References Cited
UNITED STATES PATENTS
3,654,606  4/1972  Marlowe et al. ................. 340/324 R
3,731,986  5/1973  Fergason ........................ 340/324 R
3,809,458  5/1974  Heuner et al. ................. 350/160 LC

*Primary Examiner*—David L. Trafton
*Attorney, Agent, or Firm*—Craig & Antonelli

[57] ABSTRACT

A method of driving in time division fashion a liquid crystal display device for numeric display having a plurality of sets of segment electrodes for one digit and a plurality of separated light electrodes disposed opposite to the plurality of segment electrode sets respectively, the corresponding segment electrodes of the respective digits being commonly interconnected, wherein the highest voltage $V_0$ applied to the segment and digit electrodes is divided into three voltage levels $V_0$, $V_1$ and $V_2$ ($V_0 > V_1 > V_2 > 0$), and these voltages are suitably combined to apply to a desired display point a voltage of $\pm V_0$ in its selected state and a voltage of about $\pm \frac{1}{3} V_0$ in its half-selected and its non-selected state so that the device can be driven in time division fashion by a low voltage.

5 Claims, 8 Drawing Figures

METHOD OF DRIVING LIQUID CRYSTAL DISPLAY DEVICE FOR NUMERIC DISPLAY

This invention relates to a method of driving a liquid crystal display device for numeric display and more particularly to a novel driving method capable of driving such a display device in time division (i.e. multiplex) fashion.

It is known to drive a liquid crystal display device for numeric display by a static driving method. A liquid crystal display device for numeric display having, for example, seven segment electrodes and one decimal point electrode for each of N digits requires 8N external connection terminals plus one external connection terminal for the digit electrode when it is driven by the static driving method. Thus, an increase in the number of digits has resulted in a great increase in the number of external connection terminals and in complexity of peripheral driving means giving rise to corresponding the reduction of reliability. Further, attempts have been made to miniaturize the peripheral driving means by employing large scale integrated (LSI) circuits. However, with the increase in the number of external connection terminals, two large scale integrated circuits may be required in place of one large scale integrated circuit originally required, resulting in correspondingly expensive driving means.

In an effort to obviate the defect of the static driving method which leads to an undesirable increase in the number of external connection terminals, a method of driving a liquid crystal numeric display device in time division fashion has been proposed for the purpose of reducing the number of external connection terminals by commonly interconnecting the corresponding segment electrodes of the respective digits. According to a prior art time division driving method, however, a voltage having a maximum amplitude of $\pm V_0$ (where $V_0$ is the voltage value which produces the scattering state of the liquid crystal) had been required to drive the segment driving means due to the fact that the digit electrode is generally grounded in the prior art method. Thus, switching elements in the output stage of the driving means have been demanded to withstand a voltage as high as $2 V_0$. In commonly employed liquid crystal display devices, the value of $V_0$ is of the order of 20 volts which is high enough to provide a great hindrance to adoption of integrated circuits (IC) or large scale integrated circuits in the driving means.

It is therefore a primary object of the present invention to provide a novel method which is capable of driving a liquid crystal display device for numeric display in time division fashion by a low voltage.

An important feature of the present invention resides in a method which comprises providing a plurality of digit electrodes separated for the respective digits, dividing the highest voltage $V_0$ applied to the segment and digit electrodes into three voltage levels $V_0$, $V_1$ and $V_2$ ($V_0 > V_1 > V_2 > 0$), and and suitably combining these voltages to apply to a desired display point a voltage of $\pm V_0$ in its selected state and a voltage of about $\pm \frac{1}{3} V_0$ in its half-selected state and its non-selected state so that the voltage withstanding capacity of switching elements in the output stage of the driving means can be reduced to $V_0$.

Another important feature of the present invention resides in the fact that the magnitude of the voltage applied to the segment electrodes and digit electrodes is determined depending on the phase of an address signal and clock signal applied to the driving means.

Another important feature of the present invention resides in the fact that three switching elements are provided in the driving means for dividing the voltage and are selectively actuated depending on the phase of the address signal and clock signal so as to obtain a desired driving voltage.

According to the present invention, there is provided a method of driving in time division fashion a liquid crystal display device for numeric display having a plurality of sets of segment electrodes for one digit and a plurality of digit electrodes disposed opposite to the plurality of segment electrode sets respectively, the corresponding segment electrodes of the respective digits being commonly interconnected, comprising the steps of dividing the highest voltage $V_0$ applied to the segment and digit electrodes into three voltage levels $V_0$, $V_1$ and $V_2$ ($V_0 > V_1 > V_2 > 0$), and suitably combining the divided voltages to apply to a desired display point a voltage of $\pm V_0$ in its selected state and a voltage of about $\pm \frac{1}{3} V_0$ in its half-selected state and its non-selected state.

The above and other objects and features of the present invention will become apparent when reading the following detailed description in conjunction with the accompanying drawings, in which.

Figure 1:
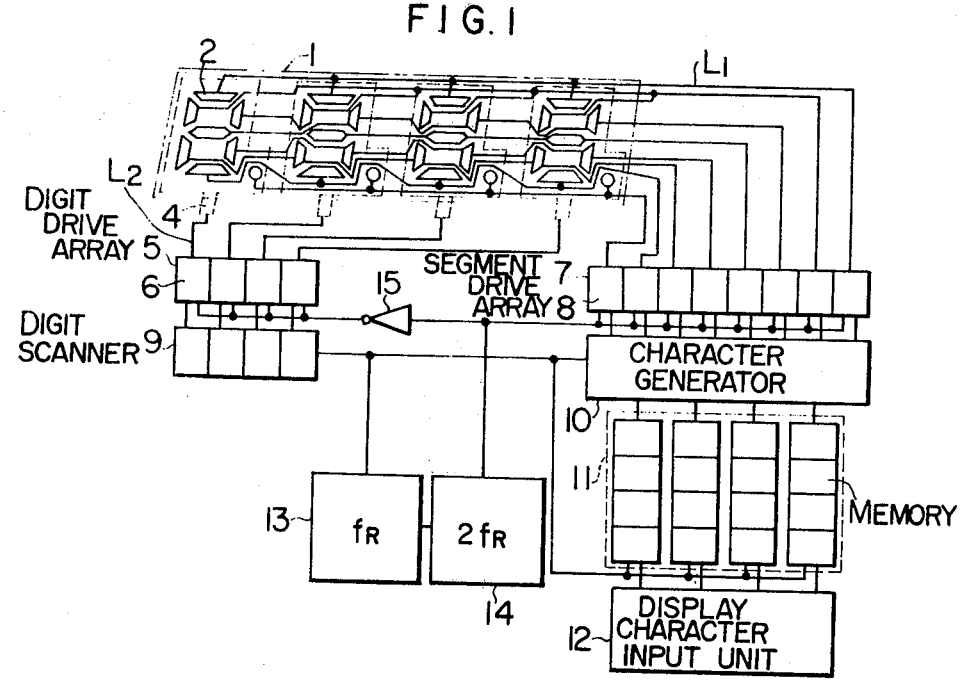
FIG. 1 is a block diagram showing the structure of a liquid crystal numeric display device driven by a method according to the present invention.

FIG. 1 shows an application of the present invention to a seven-segment electrode one-decimal point electrode type of liquid crystal numeric display device for four digits. Referring to FIG. 1, the liquid crystal numeric display device generally designated by the reference numeral 1 comprises seven segment electrodes 2 in each of four digit positions, and the corresponding segment electrodes 2 in the respective digit positions are connected in common in the device 1 to draw out them from seven segment electrode leads $L_1$. On the other hand, a digit electrode 4 is provided for each of the digits positions. These segment electrodes 2 and digit electrodes 4 are connected to respective segment driving circuits 8 and digit driving circuits 6 through the respective leads $L_1$ and $L_2$ to be driven by these driving circuits. These digit driving circuits 6 and segment driving circuits 8 are called herein a digit driving circuit array 5 and a segment driving circuit array 7 respectively.

A scanning signal is applied from a digit scanning circuit 9 which may be a ring counter to the digit driving circuit array 5, and a clock signal having a frequency of $2f_R$ is also applied to the digit driving circuit array 5 from a clock generator 14. The scanning frequency of the scanning signal is in synchronism with a frequency $f_R$ of a clock signal generated by another clock generator 13. On the other hand, an output signal of a character generating circuit 10 which may be a seven-segment decoder is applied to the segment driving circuit array 7 to which the clock signal is also applied from the clock generator 14.

An inverter 15 is provided to invert the phase of the clock signal applied to the digit driving circuit array 5 from the clock generator 14 so that the phase of the clock signal applied to the digit driving circuit array 5 is opposite to that of the clock signal applied to the segment driving circuit array 7. The output signal of the character generating circuit 10 is synchronous with the clock signal generated by the clock generator 13 so as to attain synchronization with the digit scanning. An input signal for deciding the character output of the character generating circuit 10 is applied from a memory means 11 which stores therein the characters to be displayed on the individual digit positions, and the output signal of the memory means 11 is synchronous with the clock signal generated by the clock generator 13 to attain synchronization with the digit scanning.

Thus, the displayed character information stored in the memory means 11 is converted into a driving signal for the liquid crystal numeric display device 1, and this driving signal is applied in time division fashion to the four digit positions of the liquid crystal numeric display device 1 to display the characters. The renewal of the displayed characters, that is, the renewal of the contents of the memory means 11 is carried out by a displayed character input unit 12 which may be connected to an arithmetic circuit in the case of an electronic desktop calculator or computer and to a clock or timing circuit in the case of a clock or watch.

Figure 2:
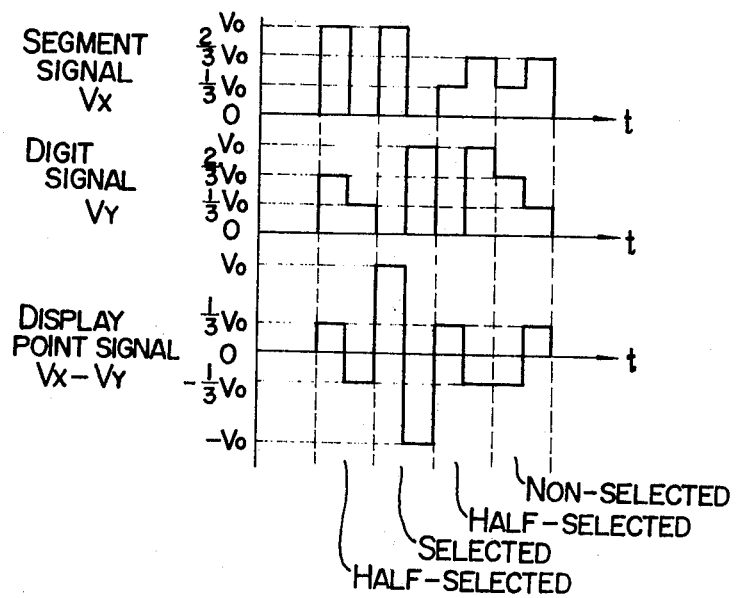
FIGS. 2 and 3 show one example of driving voltage waveforms preferably employed in the present invention.

FIG. 2 shows one example of driving voltage waveforms preferably employed in the present invention. The level of a segment signal $V_X$, a digit signal $V_Y$ and a display point signal $V_X-V_Y$ is variable depending on the selected state, half-selected state and nonselected state as shown. In FIG. 2, $V_0$ designates the voltage level which produces the scattering state of the liquid crystal. It will be seen that the segment signal $V_X$ is changed from $V_0$ to 0 during the selected state and from ⅓ $V_0$ to ⅔ $V_0$ during the non-selected state, while the digit signal $V_Y$ is changed from 0 to $V_0$ during the selected state and from ⅔ $V_0$ to ⅓ $V_0$ during the non-selected state. As a result, the signal $V_X-V_Y$ applied to the display point is $\pm V_0$ in the selected state and $\pm ⅓ V_0$ in the half-selected state. In the non-selected state, the phase of this signal is opposite to that in the half-selected state and the voltage of this signal is $\pm ⅓ V_0$.

The selected state denotes the state in which the digit electrodes and segment electrodes are simultaneously selected, the half-selected state denotes the state in which either the digit electrodes or the segment electrodes are only selected, and the non-selected state denotes the state in which none of the digit electrodes and segment electrodes are selected. Therefore, the liquid crystal (display point) between the digit electrode and the segment electrode which are placed in the selected state takes a scattering state, while it does not take the scattering state when these electrodes are placed in the half-selected or non-selected state. A voltage to the liquid crystal between the digit electrode and the segment electrode in the half-selected or non-selected state is generally called "cross talk voltage" and is averaged to ⅓ $V_0$ in FIG. 2.

Figure 3:
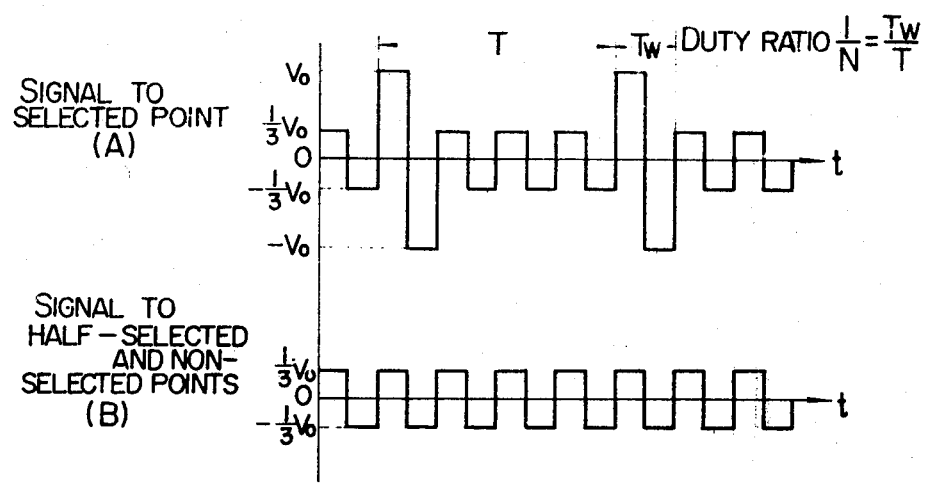

FIG. 3 shows a manner of time division driving with a duty ratio $1/N = T_H/T$. In this case, the effective value $v_{S1}$ of the voltage applied to the selected point is given by $$v_{S1} = \sqrt{\frac{1}{N} V_0^2 + \frac{N-1}{N} \frac{V_0^2}{9}} = \frac{1}{3}\sqrt{\frac{N+8}{N}} V_0 \quad (1)$$

Further, the effective value $v_{S2}$ of the voltage applied to the half-selected or non-selected point is given by $$v_{S2} = \frac{1}{3} V_0 \quad (2)$$

Suppose that Vth is the effective value of the threshold voltage of the rectangular waveform signal for producing the scattering state of the liquid crystal. Then, in order to drive the liquid crystal numeric display device in time division fashion while preventing inconveniences due to cross talk voltage, the following relation must hold among Vth, $v_{S1}$ given by the equation (1) and $v_{S2}$ given by the equation (2):

$$v_{S2} \leq Vth \leq v_{S1} \quad (3)$$

Substituting $v_{S1}$ and $v_{S2}$ in the equation (3) by those in the equations (1) and (2) to seek the relation between Vth and $V_0$, the following relation is obtained:

$$3\sqrt{\frac{N}{N+8}} Vth \leq V_0 \leq 3Vth \quad (4)$$

When now N = 4, that is, when the duty ratio is ¼, the relation (4) is expressed as $$\sqrt{3}\, Vth \leq V_0 \leq 3\, Vth \quad (5)$$

When N = 8, that is, when the duty ratio is ⅛, the relation (4) is expressed as $$\frac{3}{\sqrt{2}} Vth \leq V_0 \leq 3\, Vth \quad (6)$$

Therefore, the relation (5) is expressed as 10.4 volts $\leq V_0 \leq$ 18 volts when N = 4 and Vth = 6 volts, and it is known that the liquid crystal numeric display device can be driven by a low voltage.

FIGS. 3(A) and 3(B) show the waveforms of the signal applied to the selected point and the signal applied to the half-selected point and non-selected point when N = 4.

Figure 4:
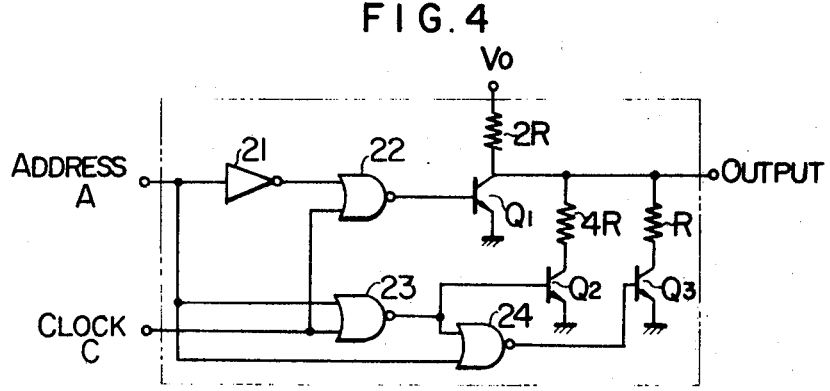
FIGS. 4, 5 and 6 are circuit diagram showing preferred practical structures of driving means shown in FIG. 1.
Figure 5:
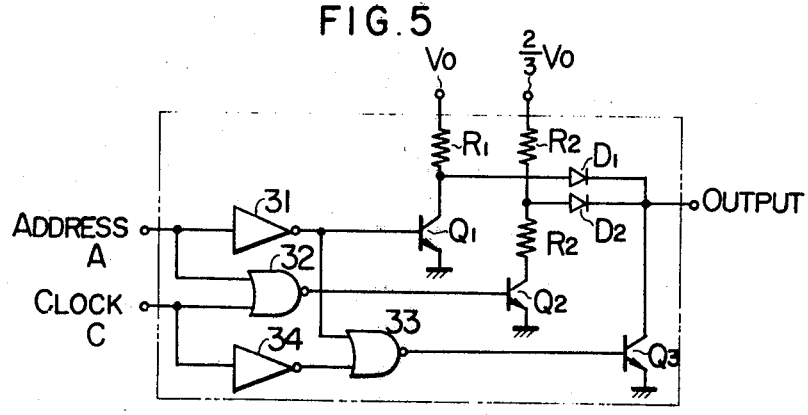
Figure 6:
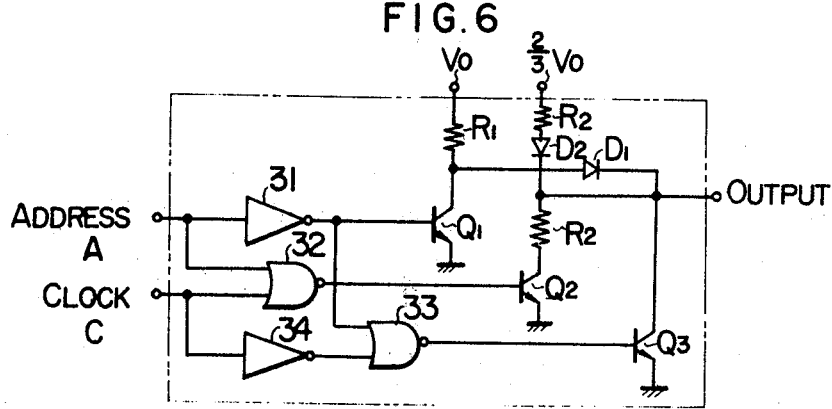

FIGS. 4, 5 and 6 show various practical structures of the driving circuits 6 and 8 shown in FIG. 1. Referring to FIG. 4, the driving circuit comprises three switching transistors $Q_1$, $Q_2$ and $Q_3$, resistors R, 2R and 4R, NOR gates 22, 23 and 24, and an inverter 21. The address signal A is applied to the inverter 21 and NOR gates 23 and 24, while the clock signal C is applied to the NOR gates 22 and 23.

Table I shows ON-OFF of the switching transistors $Q_1$, $Q_2$, $Q_3$ and the output voltage relative to the address signal A and clock signal C applied to the driving circuit shown in FIG. 4.

Table I

| Address A | Clock C | ON-Transistor | Output |
|---|---|---|---|
| 0 | 0 | $Q_2$ | $\frac{2}{3} V_0$ |
| 0 | 1 | $Q_3$ | $\frac{1}{3} V_0$ |
| 1 | 0 | $Q_1$ | 0 |
| 1 | 1 | None | $V_0$ |

It will be apparent from Table I that any one of the desired output voltages $\frac{2}{3} V_0$, $\frac{1}{3} V_0$, 0 and $V_0$ can be obtained by a suitable combination of the address signal A and clock signal C.

The driving circuit shown in FIG. 5 comprises three switching transistors $Q_1$, $Q_2$ and $Q_3$, resistors $R_1$ and $R_2$, NOR gates 32 and 33, inverters 31 and 34, and diodes $D_1$ and $D_2$. The address signal A is applied to the inverter 31 and NOR gate 32, while the clock signal C is applied to the NOR gate 32 and inverter 34.

Table II shows ON-OFF of the switching transistors $Q_1$ to $Q_3$ and the output voltage relative to the address signal A and clock signal C applied to the driving circuit shown in FIG. 5.

Table II

| Address A | Clock C | ON-Transistor | Output |
|---|---|---|---|
| 0 | 0 | $Q_1, Q_2$ | $\frac{2}{3} V_0$ |
| 0 | 1 | $Q_1$ | $\frac{1}{3} V_0$ |
| 1 | 0 | None | $V_0$ |
| 1 | 1 | $Q_3$ | 0 |

The driving circuit shown in FIG. 6 is substantially the same as that shown in FIG. 5 except the position of the diodes $D_1$ and $D_2$. Table III shows ON-OFF of the switching transistors $Q_1$ to $Q_3$ and the output voltage relative to the address signal A and clock signal C applied to the driving circuit shown in FIG. 6.

Table III

| Address A | Clock C | ON-Transistor | Output |
|---|---|---|---|
| 0 | 0 | $Q_1, Q_2$ | $\frac{2}{3} V_0$ |
| 0 | 1 | $Q_1$ | $\frac{1}{3} V_0$ |
| 1 | 0 | None | $V_0$ |
| 1 | 1 | $Q_3$ | 0 |

The address signal A shown in FIGS. 4 to 6 is the output of the digit scanning circuit 9 and character generating circuit 10 shown in FIG. 1.

Figure 7:
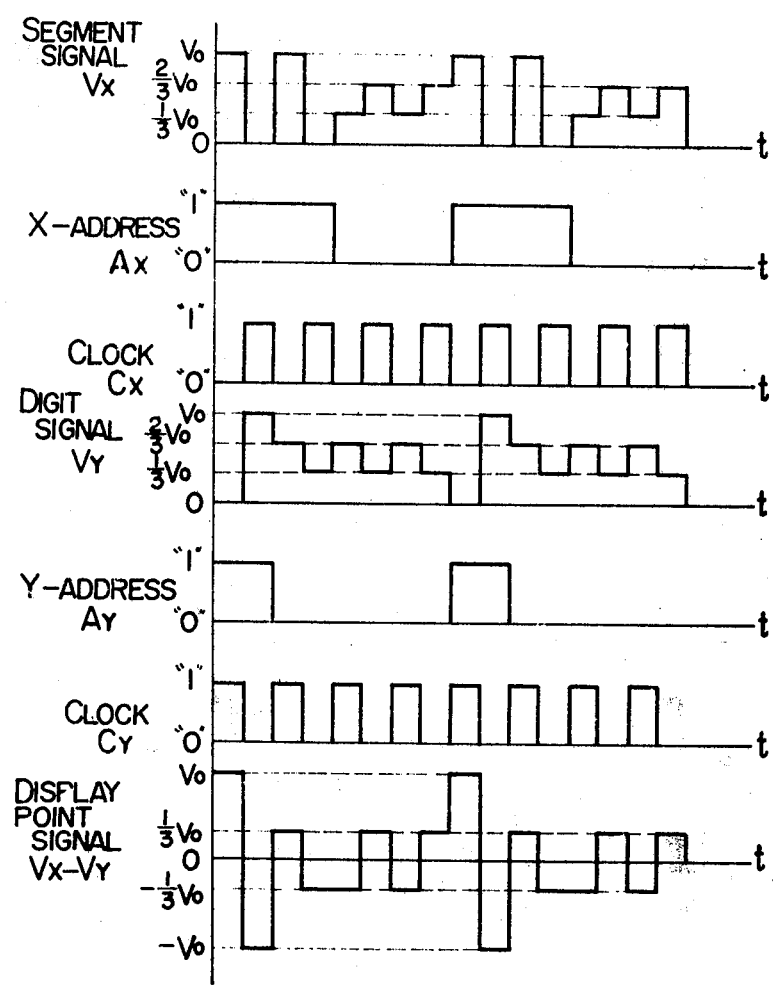
FIG. 7 shows voltage waveforms appearing at various parts of the device shown in FIG. 1 when the driving means shown in FIG. 4 are employed therein.

FIG. 7 shows operating voltage waveforms appearing at various parts of the liquid crystal numeric display device during sequential line scanning when the driving circuits are in the form shown in FIG. 4 and the duty ratio is $\frac{1}{4}$ (N = 4).

A segment clock signal $C_X$ having a waveform as shown is applied to the segment driving means, and an X-address signal $A_X$ of "1" level is applied in the selected state, while that of "0" level is applied in the non-selected state. In this case, the segment signal $V_X$ has a waveform as shown. Similarly, a digit clock signal $C_Y$ which is not in phase with the segment clock signal $C_X$ is applied to the digit driving means, and a Y-address signal $A_Y$ of "1" level is applied in the selected state, while that of "0" level is applied in the non-selected state. In this case, the digit signal $V_Y$ has a waveform as shown, and the resultant display point signal $V_{X-Y}$ has a waveform as shown.

It will thus be seen that the signal applied to the display point in the selected state is $\pm V_0$, while the signal applied to the display point in the half-selected and non-selected states is $\pm \frac{1}{3} V_0$, and the liquid crystal numeric display device can be driven in time division fashion by averaging cross talk voltage by a.d. driving.

Figure 8:
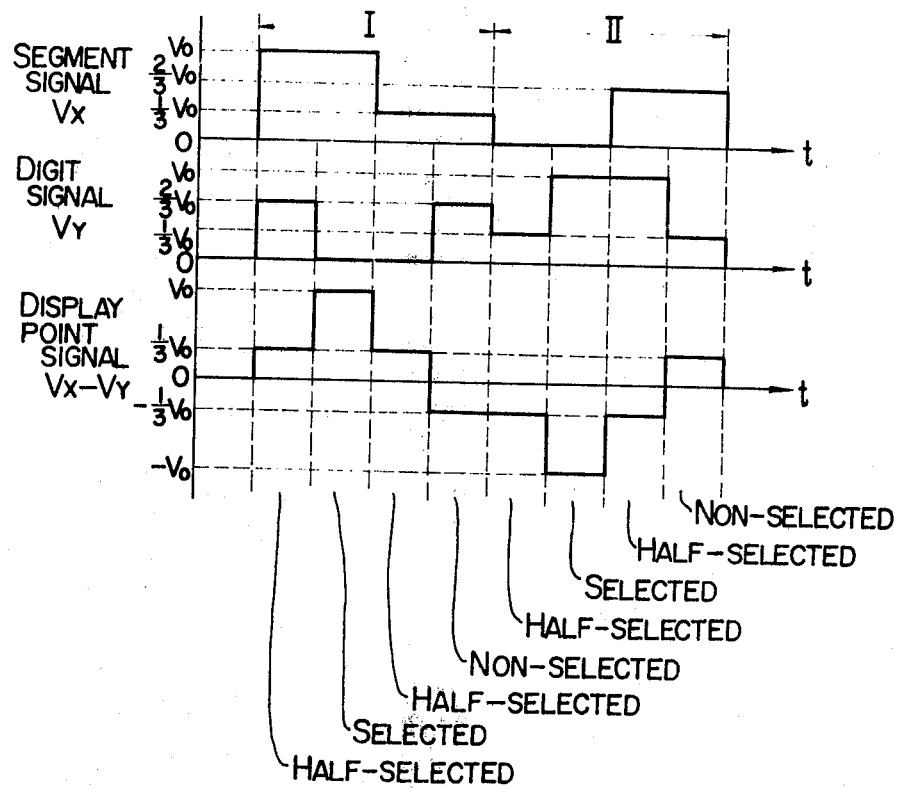
FIG. 8 shows another example of driving voltage waveforms preferably employed in the present invention.

Voltage waveforms as shown in FIG. 8 may be employed for realizing the averaging of the a.c. driving voltage by driving means similar to those above described. Referring to FIG. 8, the liquid crystal numeric display device is driven in a state as shown in I during one display period, while it is driven in a state as shown in II during the next display period, and such manner of driving is repeated.

In the period I shown in FIG. 8, the segment signal $V_X$ is $V_0$ and $\frac{1}{3} V_0$ in the selected state and non-selected state respectively, while the digit signal $V_Y$ is grounded in the selected state and is $\frac{2}{3} V_0$ in the non-selected state. As a result, the signal $V_X - V_Y$ applied to the display point is $+V_0$, $+ \frac{1}{3} V_0$ and $- \frac{1}{3} V_0$ in the selected state, half-selected state and non-selected state respectively.

In the period II, the segment signal $V_X$ is grounded in the selected state and is ** $V_0$ in the non-selected state, while the digit signal $V_Y$ is $V_0$ and $\frac{1}{3} V_0$ in the selected state and non-selected state respectively. As a result, the signal $V_X - V_Y$ applied to the display point is $-V_0$, $- \frac{1}{3} V_0$ and $+ \frac{1}{3} V_0$ in the selected state, half-selected state and non-selected state respectively and has a polarity opposite to that applied in the period I. In this manner, the a.c. driving voltage can also be averaged.

In the embodiments above described, three voltage levels $V_0$, $\frac{1}{3} V_0$ and $\frac{2}{3} V_0$ are selected and are suitably combined to apply to the display point a voltage of $\pm V_0$ in the selected state and $\pm \frac{1}{3} V_0$ in the half-selected and non-selected states. However, any other suitable means may be employed provided that the relation $V_0 > V_1 > V_2 > 0$ holds where $V_1 = \frac{2}{3} V_0$ and $V_2 = \frac{1}{3} V_0$, and the voltage $V_0$, ground potential, $V_1$ and $V_2$ are suitably combined to apply to the display point a voltage of $\pm V_0$ in the selected state and about $\pm \frac{1}{3} V_0$ in the half-selected and non-selected states.

It will be understood from the foregoing detailed description that a liquid crystal numeric display device driven by the method of the present invention can be driven in time division fashion by a low voltage. Switching elements having a breakdown voltage level of $V_0$ can be satisfactorily and reliably used in the segment driving circuits and digit driving circuits of the same structure. Further, large scale integrated circuits including these driving circuits and other logic circuits can be easily incorporated in the device. It will be easily understood that the present invention can also be applied to a matrix type liquid crystal numeric display device for driving same in time division fashion.

What we claim is:

1. A method of driving in time division fashion a liquid crystal display device for numeric display having a plurality of sets of segment electrodes for one digit and a plurality of separated digit electrodes disposed opposite to the plurality of segment electrode sets respectively, the corresponding segment electrodes of the respective digits being commonly interconnected, comprising the steps of dividing the highest voltage $V_0$ applied to said segment and digit electrodes into three voltage levels $V_0$, $V_1$ and $V_2$ ($V_0 > V_1 > V_2 > 0$), and suitably combining the divided voltages to apply to a desired display point a voltage of $\pm V_0$ in its selected state and a voltage of about $\pm \frac{1}{3} V_0$ in its half-selected state and its non-selected state.

2. A method as claimed in claim 1, wherein the voltage $V_0$ and then ground potential is applied to the segment electrode in the selected state, and the voltage $V_2$ and then voltage $V_1$ is applied to the segment electrode in the non-selected state, while the ground potential and then voltage $V_0$ is applied to the digit electrode in the selected state, and the voltage $V_1$ and then voltage $V_2$ is applied to the digit electrode in the non-selected state.

3. A method as claimed in claim 1, wherein a first display period includes application of the voltages $V_0$ and $V_2$ to the segment electrode in the selected state and non-selected state respectively and application of the ground potential and voltage $V_1$ to the digit electrode in the selected state and non-selected state respectively, and a second display period includes application of the ground potential and voltage $V_1$ to the segment electrode in the selected state and non-selected state respectively and application of the voltages $V_0$ and $V_2$ to the digit electrode in the selected state and non-selected state respectively, said first and second display periods being then sequentially repeated.

4. A method as claimed in claim 1, wherein the liquid crystal display device includes three switching means for dividing the voltage $V_0$ and logic means for selectively turning on and off said switching means, and wherein the combination of an address signal and clock signal applied to the logic means is utilized to selectively turn on and off the switching means for obtaining a desired voltage.

5. A method as claimed in claim 4, wherein two clock signals of opposite phase are applied to the logic means to obtain the respective voltages applied to the segment electrode and the digit electrode.

* * * * *